Feb. 29, 1944.  R. C. WARNEKE ET AL  2,343,211

RECIPROCATING COMPRESSOR

Filed Jan. 26, 1943

Inventors:
Roman C. Warneke,
William L. Knaus,
by Harry E. Dunham
Their Attorney.

Patented Feb. 29, 1944

2,343,211

UNITED STATES PATENT OFFICE 2,343,211

RECIPROCATING COMPRESSOR

Roman C. Warneke and William L. Knaus, Fort Wayne, Ind., assignors to General Electric Company, a corporation of New York Application January 26, 1943, Serial No. 473,612

3 Claims. (Cl. 74—44)

This invention relates to reciprocating compressors, and particularly to the reduction of noise in high speed compressors.

High speed compressors such as those employed in refrigerating machines are frequently constructed with reciprocating pistons driven by cranks or eccentrics which overhang the crankshaft bearing. At high speeds vibrations occur which may produce noise and become objectionable, even though they are not accompanied by undue wear of the mechanism. Among other things, it has been found that slight changes in alignment of the connection rod bearing and crankpin during operation under load and due to the bending of the crankpin may be a cause of objectionable noise. Accordingly, it is an object of this invention to provide a reciprocating compressor having a piston driven through a connecting rod from an overhung crank and including an arrangement for minimizing vibration or noise produced by variations in alignment of the crankpin and connecting rod bearing under load.

It is another object of this invention to provide a reciprocating compressor including a piston driven from an overhung crank and including an improved arrangement for maintaining the connecting rod bearing and crankpin in alignment, regardless of changes in load transmitted through the connecting rod.

Further objects and advantages of this invention will become apparent as the following description proceeds, and the features of novelty which characterize the invention will be set forth with particularity in the claims annexed to and forming a part of this specification.

Figure 1:
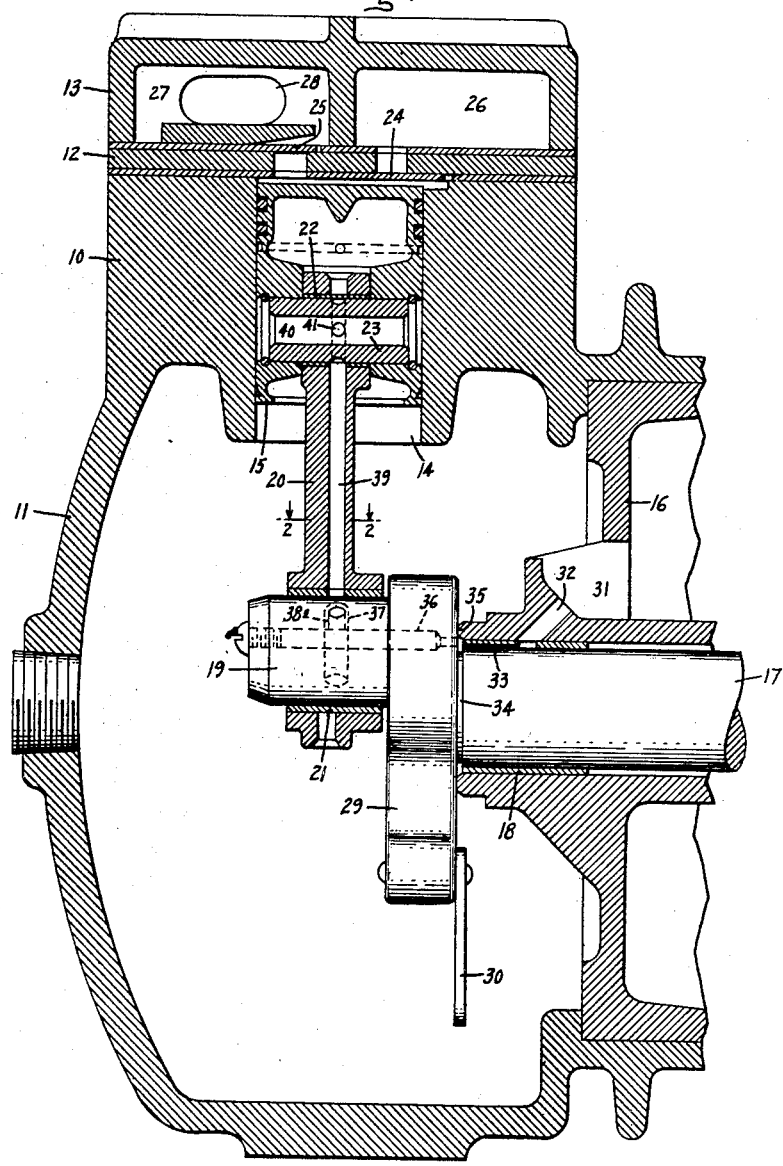
Figure 3:
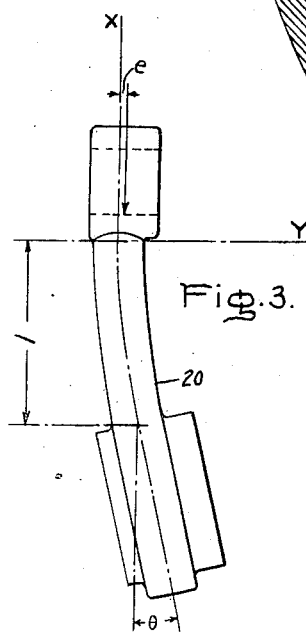
Figure 2:
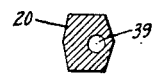

For a better understanding of the invention, reference may be had to the accompanying drawing in which Fig. 1 is a side elevation view in section of a refrigerant compressor embodying the invention; Fig. 2 is a sectional view of the connecting rod of the compressor of Fig. 1 on the line 2—2, and Fig. 3 is a diagram of the connecting rod having its bend under load exaggerated for purposes of illustrating the theory of operation of the invention.

Briefly, the compressor illustrated in the drawing comprises a compressor crankcase and cylinder block, and the driving motor therefor, assembled as a unit. The compressor includes a reciprocating piston which is connected to be driven by the motor through a crank overhanging the bearing in which the motor shaft is journaled. Under load, and particularly at high speeds, the bending of the crankpin tends to produce changes in the alignment of the connecting rod bearing and the crankpin, and noise or vibration results. In order to maintain the crankpin and connecting rod bearing in alignment, regardless of changes of load, the connecting rod is designed as an eccentric column which bends under load in such a manner that the bearing is inclined at the same angle as the crankpin, and alignment is thereby maintained correct so that noise due to changes in alignment is eliminated.

Referring now to the drawing, the compressor shown in Fig. 1 includes a cylinder block 10 and a casing or crankcase 11 formed integrally therewith and having a valve plate 12 and cylinder head 13 secured thereon. Within the cylinder block 10 is provided a cylinder 14 in which is mounted a piston 15. The compressor is driven by an electric motor, the frame of which is shown at 16 and which is secured by a press fit or in any other suitable manner within the compressor casing 11. The motor 16 includes a shaft 17 mounted in a suitable bearing 18 and having a crankpin 19 overhanging the bearing. The piston 15 is connected to the crankpin 19 for operation by a connecting rod 20 having a bearing 21 engaging the crankpin, and a bearing 22 engaging a wrist pin 23 in the piston 15. The connecting rod 20 is journaled on the crankpin 19 and pivotally secured to the piston, and the piston is reciprocated by rotation of the shaft 17. The compressor is provided with a suitable intake valve, such as a flexible valve leaf 24, and with a suitable discharge valve which may be a similar flexible leaf 25. During the operation of the compressor refrigerant or other gas to be compressed enters an intake chamber 26 in the compressor head 13 from an intake connection (not shown) and is drawn into the cylinder 14 above the piston 15. The piston 15 compresses and discharges the gas into a chamber 27 in the head 13 from which it passes through an outlet opening 28 to be discharged from the compressor. A suitable counterbalance 29 is provided on the shaft 17 on the side opposite the crankpin 19.

In order to lubricate the moving parts of the compressor a splashing finger 30 is provided which dips into a body of oil normally maintained in the bottom of the crankcase formed by the casing 11. The oil splashed upwardly falls into a reservoir 31 and reaches a bearing 18 through a duct 32. Oil also flows through a duct 33 within the bearing 18 between the duct 32 and the end of the shaft and reaches an annular groove 34 between the counter-weight 29 and the bearing structure. The edges of the bearing supporting structure are formed to provide an annular sealing face as indicated at 35, the seal cooperating with the face of the counter-balance 29. The effect of centrifugal force on the oil within the groove 34 causes a flow of oil through a duct 36 in the crankpin, and a suitable porting groove 37 is connected to duct 36 through a radial duct 38. Oil thus reaches the engaging surfaces between the crankpin 19 and the bearing 21. The porting groove 37 provides communication between the duct 36 and an oil passage or duct 39 passing through the connecting rod 20, during that portion of the rotation of the crankpin when the force of the body of oil within the passage 39 tends to cause the oil to flow toward the piston. A steady flow of oil is thereby produced due to the centrifugal force, and the force of momentum of the oil column in the duct 39, and the oil thus reaches the piston through a cross passage 40 in the wrist pin 23, and it reaches the bearing 22 through a suitable opening 41 in the wrist pin.

During the operation of the compressor under load, the crankpin 19 tends to bend. The amount of bending is, of course, very slight and is imperceptible to the eye. However, at high speeds the bending of the crankpin tends to change its alignment with the bearing 21 so that the bearing and pin do not remain parallel. Consequently, there is a shifting of the area at which pressure is applied between the crankpin and the bearing and noise or vibration is produced. Objectionable noise may occur, even though no undue wear of the bearing results.

In the compressor, as illustrated in the drawing, the connecting rod 20 has been designed as an eccentric column which bends under load in such a manner that the bearing 21 and crankpin 19 are maintained in alignment throughout variations in the load applied. The oil duct 39 connects the centers of the bearings 21 and 22, however, the major portion of the connecting rod 20 is at the left of the center line between the bearings so that the load is applied eccentrically. The cross section of the connecting rod is indicated at Fig. 2. The bending of the connecting rod 20, which constitutes an eccentric column, is produced by the same force which bends the crankpin 19 and is proportional thereto. When the connecting rod 20 is constructed in accordance with this invention, bearing 21 is maintained parallel with the connecting rod 19 so that the journal and bearing remain in alignment regardless of changes in load in the compressor. Noise produced by changes in alignment is, therefore, eliminated.

In Fig. 3 the bend in the connecting rod 20 has been exaggerated for purposes of illustrating the manner in which the dimensions of the connecting rod are determined. The characteristics of eccentrically loaded columns are well known, as are also the characteristics of cantilever beams. The connecting rod 20, as has been indicated, constitutes an eccentrically loaded column; the crankpin 19 constitutes a loaded cantilever beam. The theory of beams and columns under stress is well established, and the necessary formulas are readily available. It has been found that certain approximations are useful in determining the dimensions of the connecting rod of the compressor, such as that indicated at 20 in the drawing, and the formulas given below are included as an illustration of a method which may be useful in the design of the connecting rod.

The moment equation for beams and columns is:

$$M = EI\frac{d^2y}{dx^2}$$

where:

$M$ = bending moment
$E$ = modulus of elasticity
$I$ = area moment of section
$P$ = load
$x$ = distance along beam
$y$ = distance at right angles to beam axis (deflection)

For an eccentrically loaded column $$M = -P(y+e)$$

where:

$y$ = deflection
$e$ = eccentricity then $$EI\frac{d^2y}{dx^2} = -P(y+e) \qquad (1)$$

The eccentricity $e$ of the connecting rod 20 is purposely made large to minimize variations in manufacturing, and, since the rod must be relatively rigid, the deflection $y$ is small relatively to the eccentricity and can be neglected.

therefore:

$$EI\frac{d^2y}{dx^2} = -Pe \text{ (approx.)}$$

integrating:

$$EI\frac{dy}{dx} = -Pex + C \qquad (2)$$

The column (connecting rod) is confined at its upper end where it is held between the bosses supporting the wrist pin, at this end, as indicated in Fig. 3, $x=0$ and $$\frac{dy}{dx} = 0$$

therefore $C=0$ and $$EI\frac{dy}{dx} = -Pex \qquad (3)$$

The slope of the column at the crankpin end of the connecting rod must be determined to find the angle of the bearing under load. At the crankpin end $x=l$ where $l$ is the length of the column. The slope at this end =

$$\left(\frac{dy}{dx}\right)_l = \tan \theta$$

and Equation 3 may be written $$EI \tan \theta = -Pel \qquad (4)$$

The slope (tan $\theta$) of the crankpin under load may be determined by actual measurement of the deflection or by calculation. The calculation of the deflection is complicated by the differences in the cross sections of the crankpin and the counterweight and by some bending of the shaft within the bearing. A suitable graphical method for determining the deflection is suggested by A. E. Ault in Product Engineering, vol. 2, No. 10, page 456, in an article entitled, "Deflection in shafts of variable cross section." This graphical method is sometimes called Castigliano's method.

The values of $e$ and $l$ are determined within fairly close limits by the particular compressor under consideration; after tan $\theta$ has been determined the connecting rod section to establish the correct value of $I$ can be determined in accordance with standard design practice.

The solution obtained by the above equations is approximate as has been indicated and a more exact solution could be obtained if required. However, satisfactory results can be obtained with the approximate solution in many cases.

A compressor including a connecting rod constructed in the manner set forth above may be operated at high speeds without noise or vibration caused by the bending of the crankpin under load. Since this bending is proportional to load, and since the bending of the connecting rod is also proportional to load, the connecting rod bearing and crankpin journal are maintained in alignment regardless of variations in load.

It is readily apparent from the foregoing that a simple and effective arrangement has been provided for minimizing noise due to distortion of the crankpin under load. The invention may be employed in reciprocating compressors and other similar devices which include overhung crankpins, and where there is a tendency to noise or vibration due to the bending of the crankpin under load.

While the invention has been shown and described in connection with a refrigerant compressor, other applications will readily be apparent to those skilled in the art. It is, therefore, not desired that the invention be limited to the particular construction shown and described, and it is intended in the appended claims to cover all modifications within the spirit and scope of the invention.

What we claim as new and desire to secure by Letters Patent of the United States is:

1. In a reciprocating compressor, a piston and a crankshaft, a bearing for said crankshaft, a crankpin on said shaft overhanging said bearing, a connecting rod having a bearing journaled on said crankpin for connecting said piston to be driven by said crankshaft, said crankpin tending to bend under load and said connecting rod constituting an eccentrically loaded column having such cross section and length and eccentricity as to maintain the bearing on said connecting rod in alignment with said crankpin throughout variations in the load thereon.

2. A reciprocating compressor including a cylinder and a piston in said cylinder, a crankshaft, a bearing for said crankshaft, a crankpin on said shaft overhanging said bearing whereby said crankpin tends to bend under load, and a relatively stiff connecting rod having bearings for engaging said crankpin and said piston to drive said piston, said connecting rod being displaced longitudinally of said crankpin with respect to the center line through its bearings whereby said connecting rod under load constitutes an eccentrically loaded column, the cross section of said connecting rod and the eccentricity of said column and the length thereof being selected so that the crankpin bearing on said connecting rod is inclined under load at the same angle as said crankpin to maintain said bearing and said crankpin in alignment throughout variations of load.

3. A reciprocating compressor including a cylinder and a piston in said cylinder, a crankshaft, a bearing for said crankshaft, a crankpin on said shaft overhanging said bearing whereby said crankpin tends to bend under load, a relatively stiff connecting rod having a crankpin bearing at one end and a piston bearing at the other, means for supplying lubricant to said crankpin bearing, said connecting rod being displaced longitudinally of said crankpin with respect to the center line through said piston and crankpin bearings and having a lubricant conducting passage along the center line between said bearings, said connecting rod constituting an eccentrically loaded column having such eccentricity and length and cross section that said crankpin bearing is inclined under load at the same angle as said crankpin to maintain said crankpin bearing and said crankpin in alignment throughout variations in load.

ROMAN C. WARNEKE.
WILLIAM L. KNAUS.